(12) United States Patent
Zhou et al.

(10) Patent No.: US 9,153,074 B2
(45) Date of Patent: Oct. 6, 2015

(54) WEARABLE AUGMENTED REALITY EYEGLASS COMMUNICATION DEVICE INCLUDING MOBILE PHONE AND MOBILE COMPUTING VIA VIRTUAL TOUCH SCREEN GESTURE CONTROL AND NEURON COMMAND

(71) Applicants: Dylan T X Zhou, San Gabriel, CA (US); Tiger T G Zhou, Tiburon, CA (US); Andrew H B Zhou, Tiburon, CA (US)

(72) Inventors: Dylan T X Zhou, San Gabriel, CA (US); Tiger T G Zhou, Tiburon, CA (US); Andrew H B Zhou, Tiburon, CA (US)

( * ) Notice: Subject to any disclaimer, the term of this patent is extended or adjusted under 35 U.S.C. 154(b) by 314 days.

(21) Appl. No.: 13/973,146

(22) Filed: Aug. 22, 2013

(65) Prior Publication Data
US 2013/0346168 A1  Dec. 26, 2013

Related U.S. Application Data

(63) Continuation-in-part of application No. 13/753,855, filed on Jan. 30, 2013, and a continuation-in-part of application No. 13/185,491, filed on Jul. 18, 2011, and a continuation-in-part of application No. 13/776,852, filed on Feb. 26, 2013, and a continuation-in-part of application No. 13/287,279, filed on Nov. 2, 2011.

(51) Int. Cl.
*G02B 27/01* (2006.01)
*G06T 19/00* (2011.01)
*G06F 3/01* (2006.01)
(Continued)

(52) U.S. Cl.
CPC .............. *G06T 19/006* (2013.01); *G01C 21/00* (2013.01); *G06F 1/163* (2013.01); *G06F 3/012* (2013.01); *G06F 3/013* (2013.01); *G06F 3/017* (2013.01); *G06F 3/0426* (2013.01); *G06Q 20/3276* (2013.01); *G06Q 30/0641* (2013.01); *G08B 21/06* (2013.01); *G02B 27/017* (2013.01); *G02B 2027/014* (2013.01); *G02B 2027/0138* (2013.01); *G02B 2027/0178* (2013.01)

(58) Field of Classification Search
CPC .............. G06T 19/006; G02B 27/017; G02B 2027/0178; G02B 2027/0138; G02B 2027/014; G06F 3/0426; G06F 3/017; G06F 3/012; G06F 3/013; G06F 1/163; G08B 21/06; G06K 7/1404; G06K 9/00; G06Q 20/3276; G06Q 30/0641
See application file for complete search history.

(56) References Cited

U.S. PATENT DOCUMENTS 6,091,546 A * 7/2000 Spitzer .......................... 359/618
7,631,968 B1 * 12/2009 Dobson et al. ................ 351/158

(Continued)

*Primary Examiner* — Daniel Walsh
(74) *Attorney, Agent, or Firm* — Georgiy L. Khayet

(57) ABSTRACT

Provided are an augmented reality eyeglass communication device and a method for facilitating shopping using an augmented reality eyeglass communication device. The augmented reality eyeglass communication device may comprise a frame, and a right earpiece and a left earpiece connected to the frame. Furthermore, the eyeglass communication device may comprise a processor configured to receive one or more commands of a user, perform operations associated with the commands of the user, receive product information, and process the product information. The eyeglass communication device may comprise a display connected to the frame and configured to display data received from the processor. In addition to that, the eyeglass communication device may comprise a transceiver electrically connected to the processor and configured to receive and transmit data over a wireless network. The eyeglass communication device may comprise a Subscriber Identification Module card slot, a camera, an earphone, a microphone, and a charging unit.

99 Claims, 6 Drawing Sheets

(51) Int. Cl.
   *G06F 3/042* (2006.01)
   *G08B 21/06* (2006.01)
   *G06Q 30/06* (2012.01)
   *G01C 21/00* (2006.01)
   *G06F 1/16* (2006.01)
   *G06Q 20/32* (2012.01)

(56) References Cited

U.S. PATENT DOCUMENTS

| | | | | |
|---|---|---|---|---|
| 8,092,011 | B2* | 1/2012 | Sugihara et al. | 351/158 |
| 8,210,676 | B1* | 7/2012 | Hunt | 351/133 |
| 8,427,508 | B2 | 4/2013 | Mattila et al. | |
| 8,985,442 | B1* | 3/2015 | Zhou et al. | 235/380 |
| 2001/0017663 | A1* | 8/2001 | Yamaguchi et al. | 348/373 |
| 2002/0017567 | A1* | 2/2002 | Connolly et al. | 235/472.02 |
| 2003/0067585 | A1* | 4/2003 | Miller et al. | 351/123 |
| 2004/0104864 | A1* | 6/2004 | Nakada | 345/8 |
| 2004/0225613 | A1* | 11/2004 | Narayanaswami et al. | 705/64 |
| 2005/0164747 | A1* | 7/2005 | Levy | 455/569.1 |
| 2005/0201585 | A1* | 9/2005 | Jannard et al. | 381/381 |
| 2005/0275714 | A1* | 12/2005 | Ishikawa et al. | 348/14.02 |
| 2005/0278446 | A1* | 12/2005 | Bryant | 709/227 |
| 2006/0109350 | A1* | 5/2006 | Yeh | 348/207.99 |
| 2006/0153409 | A1* | 7/2006 | Yeh | 381/333 |
| 2007/0008484 | A1* | 1/2007 | Jannard | 351/41 |
| 2007/0104333 | A1* | 5/2007 | Kuo | 381/74 |
| 2008/0169998 | A1* | 7/2008 | Jacobsen et al. | 345/8 |
| 2008/0198324 | A1* | 8/2008 | Fuziak | 351/158 |
| 2009/0161225 | A1* | 6/2009 | Liu | 359/643 |
| 2009/0219788 | A1* | 9/2009 | Henley, Jr. | 368/13 |
| 2009/0251661 | A1* | 10/2009 | Fuziak, Jr. | 351/158 |
| 2010/0079356 | A1* | 4/2010 | Hoellwarth | 345/8 |
| 2010/0110368 | A1* | 5/2010 | Chaum | 351/158 |
| 2010/0112964 | A1* | 5/2010 | Yi et al. | 455/90.3 |
| 2010/0273123 | A1* | 10/2010 | Mecher | 433/29 |
| 2011/0059769 | A1* | 3/2011 | Brunolli | 455/556.1 |
| 2011/0193963 | A1* | 8/2011 | Hess et al. | 348/157 |
| 2011/0213664 | A1* | 9/2011 | Osterhout et al. | 705/14.58 |
| 2011/0221657 | A1* | 9/2011 | Haddick et al. | 345/8 |
| 2011/0246284 | A1* | 10/2011 | Chaikin et al. | 705/14.38 |
| 2012/0021393 | A1* | 1/2012 | Thorn | 434/247 |
| 2012/0029994 | A1* | 2/2012 | Barkan et al. | 705/14.25 |
| 2012/0062850 | A1* | 3/2012 | Travis | 353/31 |
| 2012/0188501 | A1* | 7/2012 | Johnson et al. | 351/158 |
| 2012/0194976 | A1* | 8/2012 | Golko et al. | 361/679.01 |
| 2012/0209749 | A1* | 8/2012 | Hammad et al. | 705/27.1 |
| 2012/0212399 | A1 | 8/2012 | Border et al. | |
| 2012/0281961 | A1* | 11/2012 | Forbes | 386/224 |
| 2012/0293548 | A1 | 11/2012 | Perez et al. | |
| 2012/0316456 | A1* | 12/2012 | Rahman et al. | 600/547 |
| 2013/0002559 | A1* | 1/2013 | Vardi | 345/168 |
| 2013/0002724 | A1 | 1/2013 | Heinrich et al. | |
| 2013/0021374 | A1 | 1/2013 | Miao et al. | |
| 2013/0044042 | A1 | 2/2013 | Olsson et al. | |
| 2013/0054390 | A1* | 2/2013 | Kerchner et al. | 705/17 |
| 2013/0146659 | A1* | 6/2013 | Zhou et al. | 235/380 |
| 2013/0172068 | A1* | 7/2013 | Zhou et al. | 463/16 |
| 2013/0225290 | A1* | 8/2013 | Zhou et al. | 463/31 |
| 2013/0238455 | A1* | 9/2013 | Laracey | 705/21 |
| 2013/0241927 | A1* | 9/2013 | Vardi | 345/419 |
| 2013/0242253 | A1* | 9/2013 | Blum et al. | 351/158 |
| 2013/0265300 | A1* | 10/2013 | Vardi | 345/419 |
| 2013/0346168 | A1* | 12/2013 | Zhou et al. | 705/14.4 |
| 2014/0078462 | A1* | 3/2014 | Abreu | 351/111 |
| 2014/0085190 | A1* | 3/2014 | Erinjippurath et al. | 345/156 |
| 2014/0266988 | A1* | 9/2014 | Fisher et al. | 345/8 |
| 2014/0330656 | A1* | 11/2014 | Zhou et al. | 705/16 |

\* cited by examiner

WEARABLE AUGMENTED REALITY EYEGLASS COMMUNICATION DEVICE INCLUDING MOBILE PHONE AND MOBILE COMPUTING VIA VIRTUAL TOUCH SCREEN GESTURE CONTROL AND NEURON COMMAND

CROSS-REFERENCE TO RELATED APPLICATIONS

This application is a continuation-in-part of U.S. patent application Ser. No. 13/753,855, entitled "WEARABLE PERSONAL DIGITAL EYEGLASS DEVICE," filed on Jan. 30, 2013; U.S. patent application Ser. No. 13/185,491, entitled "FACILITATING MOBILE DEVICE PAYMENTS USING PRODUCT CODE SCANNING," filed on Jul. 18, 2011; U.S. patent application Ser. No. 13/776,852, entitled "WEARABLE PERSONAL DIGITAL FLEXIBLE CLOUD GAME, MULTIMEDIA, COMMUNICATION AND COMPUTING DEVICE," filed on Feb. 26, 2013; and U.S. patent application Ser. No. 13/287,279, entitled "METHODS AND SYSTEMS TO ADVERTISE AND SELL PRODUCTS OR SERVICES VIA CLOUD GAMING ENVIRONMENTS," filed on Nov. 2, 2011, all of which are incorporated herein by reference in their entireties for all purposes.

FIELD

This application relates generally to wearable personal digital interfaces and, more specifically, to an augmented reality eyeglass communication device.

BACKGROUND

Typically, a person who goes shopping attends several stores to compare assortment of goods, prices and availability of desired products. Handheld digital devices, e.g. smartphones, have become efficient assistants for performing shopping. The person may, for example, create a list of products to buy and may save this list on a smartphone. When being at the store, the smartphone may be used to scan product barcodes to retrieve product information or perform payment based on payment information encoded in the product barcodes. However, long-term constant holding of the smartphone in a hand may cause inconvenience to the person who performs shopping at the store. For example, when the person wants to take a big size product, the person firstly needs to empty his hands and, therefore, to put the smartphone into his pocket. After inspecting the desired product, the person will need to get the smartphone out of the pocket in order to scan a barcode of the desired product or to see what products left in the list of products to buy.

In addition to that, when using a smartphone in a store, a person needs to repeatedly look at a display of the smartphone, for example, to check a list of products stored on the smartphone or to read product information retrieved from a product barcode. Therefore, time spent on shopping may increase.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are an augmented reality eyeglass communication device for facilitating shopping and a method for facilitating shopping using the augmented reality eyeglass communication device.

In certain embodiments, the augmented reality eyeglass communication device may comprise a frame having a first end and a second end, and a right earpiece connected to the first end of the frame and a left earpiece connected to the second end of the frame. Furthermore, the eyeglass communication device may comprise a processor disposed in the frame, the right earpiece or the left earpiece and configured to receive one or more commands of a user, perform operations associated with the commands of the user, receive product information, and process the product information. The eyeglass communication device may comprise a display connected to the frame and configured to display data received from the processor. The display may include an optical prism element and a projector embedded in the display. The projector may be configured to project the data received from the processor to the optical prism element. In addition to that, the eyeglass communication device may comprise a transceiver electrically connected to the processor and configured to receive and transmit data over a wireless network. In the frame, the right earpiece or the left earpiece of the eyeglass communication device a Subscriber Identification Module (SIM) card slot may be disposed. The eyeglass communication device may comprise a camera disposed on the frame, the right earpiece or the left earpiece, at least one earphone disposed on the right earpiece or the left earpiece, a microphone configured to sense a voice command of the user, and a charging unit connected to the frame, the right earpiece or the left earpiece. The eyeglass communication device may be configured to perform phone communication functions.

In certain embodiments, a method for facilitating shopping using an augmented reality eyeglass communication device may include receiving, by a processor of the eyeglass communication device, product information associated with products comprised in a list of products of a user. Furthermore, the method may involve receiving, by the processor, location information associated with location of the user. In further embodiments, the method may include searching, based on the product information, by the processor, a database associated with a store for availability, location and pricing information associated with the products. The method may involve receiving, by the processor, the availability, location and pricing information associated with the product, and displaying, by a display of the eyeglass communication device, the availability, location and pricing information associated with the product.

In further exemplary embodiments, modules, subsystems, or devices can be adapted to perform the recited steps. Other features and exemplary embodiments are described below.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
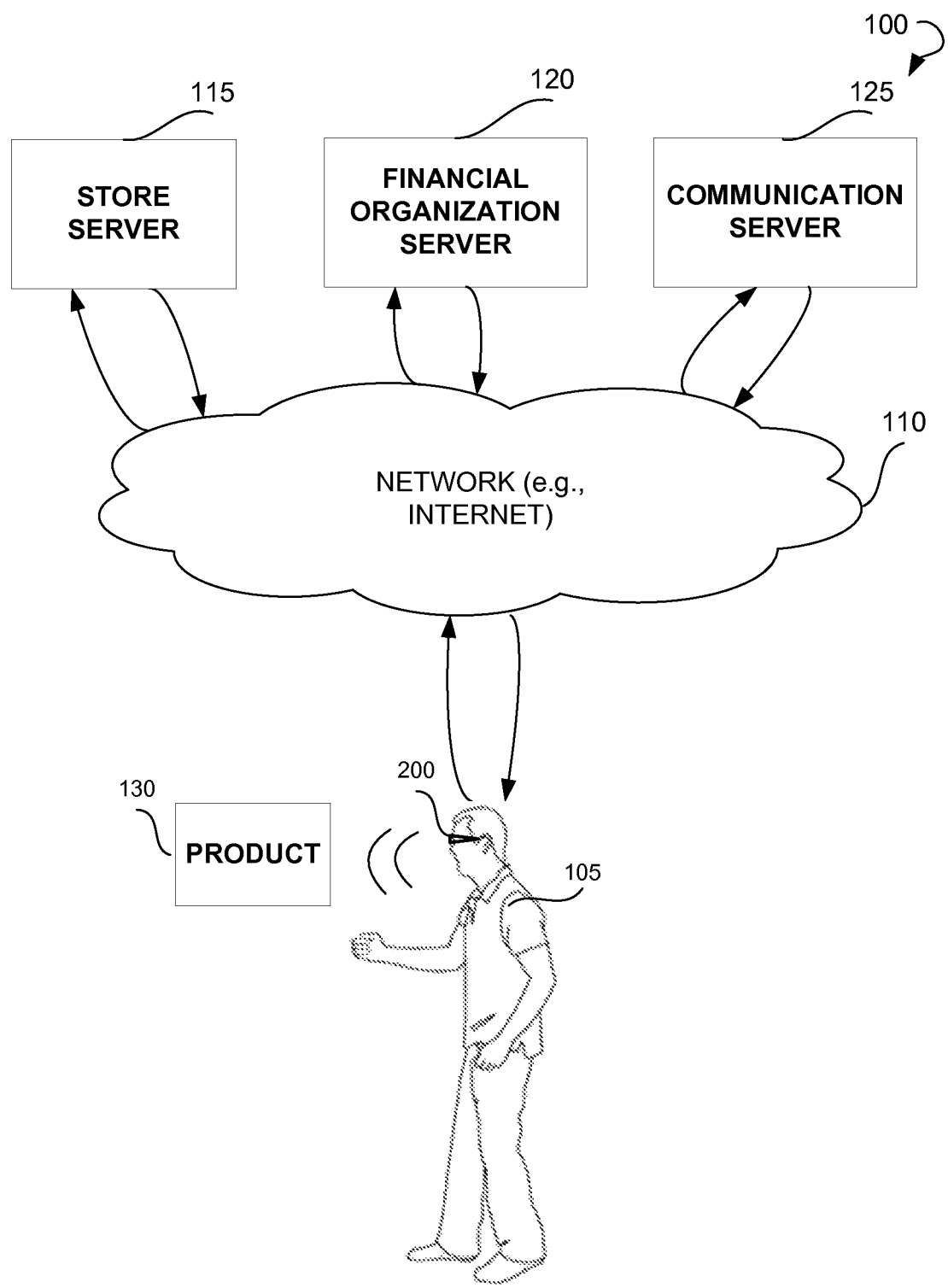
FIG. 1 illustrates an environment within which an augmented reality eyeglass communication device for facilitating shopping and a method for facilitating shopping using an augmented reality eyeglass communication device may be implemented, in accordance with an example embodiment.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

An augmented reality eyeglass communication device for facilitating shopping and a method for facilitating shopping using the augmented reality eyeglass communication device are described herein. The eyeglass communication device allows a user to visually access information by simply looking trough eyeglass lenses configured as a display. Being worn by the user, the eyeglass communication device may provide for convenient carrying in many situations and environments, such as physical activity, sports, travels, shopping, telephone conversations, leisure time, and so forth.

Disposing a processor, a transmitter, and SIM card slot in a structure of the eyeglass communication device, as well as insertion of a SIM card into the SIM card slot may allow the eyeglass communication device to perform communication functions of a mobile phone, e.g. a smartphone, and display data on a display of the eyeglass communication device. In this case, a user may review the data simply looking through lenses of the eyeglass communication device. The user may store information in a memory unit of the eyeglass communication device and review the information on the display of the eyeglass communication device. Furthermore, with the help of the eyeglass communication device, the user may perform a number of functions of the smartphone, such as accept or decline phone calls, make phone calls, listen to the music stored in the memory unit of the eyeglass communication device, a remote device or accessed via the Internet, view maps, check for weather forecasts, control remote devices to which the eyeglass communication device is currently connected, such as a computer, a TV, an audio or video system, and so forth. Additionally, the eyeglass communication device may allow the user to make a photo or video and upload it to a remote device or to the Internet.

An augmented reality eyeglass communication device may be a useful tool for facilitating shopping. In particular, the user may use the eyeglass communication device to scan an image, a barcode of a product or to read a RFID tag of the product. The information retrieved from the image, barcode or RFID tag may be displayed to the user. Therefore, the user may look at the product in a store and may see real-world environment, i.e. the product itself, augmented by information about the product displayed on a display of the eyeglass communication device. The display of the eyeglass communication device may be configured as an eyeglass lens, such as a prescription lens or a lens without diopters, and may include an optical prism element and a projector embedded into the display. Additionally, the display may be configured as a bionic contact lens, which may include integrated circuitry for wireless communications. In some embodiments, the camera lens may be configured to track eye movements. The tracked eye movements may be transmitted to the processor and interpreted as a command.

The projector may project an image received from a processor of the eyeglass communication device to the optical prism element. The optical prism element may be configured so as to focus the image to a retina of the user.

The eyeglass communication device may be configured to sense and process voice commands of the user. Therefore, the user may give voice commands to the eyeglass communication device and immediately see data associated with the commands on the display of the eyeglass communication device. The commands of the user may be processed by a processor of the eyeglass communication device or may be sent to a remote device, such as a search server, and information received from the remote device may be displayed on the display of the eyeglass communication device.

Additionally, the device may be used as a hands-free mobile computing device, to synchronize with one or more external devices in real time, track a geographical location of the one or more external devices in real time, and provide communication capabilities using an embedded emergency button configured to provide a medical alert signal, a request for help signal, or another informational signal.

Referring now to the drawings, FIG. 1 illustrates an environment 100 within which a user 105 wearing an augmented reality eyeglass communication device 200 for facilitating shopping and methods for facilitating shopping using an augmented reality eyeglass communication device 200 can be implemented. The environment 100 may include a user 105, an eyeglass communication device 200, a communication network 110, a store server 115, a financial organization server 120, and a communication server 125.

The device 200 may communicate with the store server 115, the financial organization server 120, and the communication server 125 via the network 110. Furthermore, the device 200 may retrieve information associated with a product 130 by, for example, scanning an image or a barcode of the product 130 or reading an RFID tag of the product 130.

In various embodiments, the barcode may include a one-dimensional barcode, a two-dimensional barcode, a three-dimensional barcode, a quick response code, a snap tag code, and other machine readable codes. The barcode may encode payment data, personal data, credit card data, debit card data, gift card data, prepaid card data, bank checking account data, digital cash data, and so forth. Additionally, the barcode may include a link to a web-resource, a payment request, advertising information, and other information. The barcode may encode electronic key data and be scannable by a web-camera of an access control system. The scanned data may be processed by the access control system and access to an item related to the access control system may be granted based on the processing.

The network 110 may include the Internet or any other network capable of communicating data between devices. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET)

connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a SCSI (Small Computer Systems Interface) connection, a Universal Serial Bus (USB) connection or other wired or wireless, digital or analog interface or connection, mesh or Digi® networking. The network 110 may include any suitable number and type of devices (e.g., routers and switches) for forwarding commands, content, and/or web object requests from each client to the online community application and responses back to the clients. The device 200 may be compatible with one or more of the following network standards: GSM, CDMA, LTE, IMS, Universal Mobile Telecommunication System (UMTS), RFID, 4G, 5G, 6G and higher. The device 200 may communicate with the GPS satellite via the network 110 to exchange data on a geographical location of the device 200. Additionally, the device 200 may communicate with mobile network operators using a mobile base station. In some embodiments, the device 200 may be used as a standalone system operating via a WiFi module or a Subscriber Identity Module (SIM) card.

The methods described herein may also be practiced in a wide variety of network environments (represented by network 110) including, for example, TCP/IP-based networks, telecommunications networks, wireless networks, etc. In addition, the computer program instructions may be stored in any type of computer-readable media. The program may be executed according to a variety of computing models including a client/server model, a peer-to-peer model, on a stand-alone computing device, or according to a distributed computing model in which various functionalities described herein may be effected or employed at different locations.

Additionally, the user 105 wearing the device 200 may interact via the bidirectional communication network 110 with the one or more remote devices (not shown). The one or more remote devices may include a television set, a set-top box, a personal computer (e.g., a tablet or a laptop), a house signaling system, and the like. The device 200 may connect to the one or more remote devices wirelessly or by wires using various connections such as a USB port, a parallel port, an infrared transceiver port, a radiofrequency transceiver port, and so forth.

For the purposes of communication, the device 200 may be compatible with one or more of the following network standards: GSM, CDMA, LTE, IMS, Universal Mobile Telecommunication System (UMTS), 4G, 5G, 6G and upper, RFID, and so forth.

Figure 2:
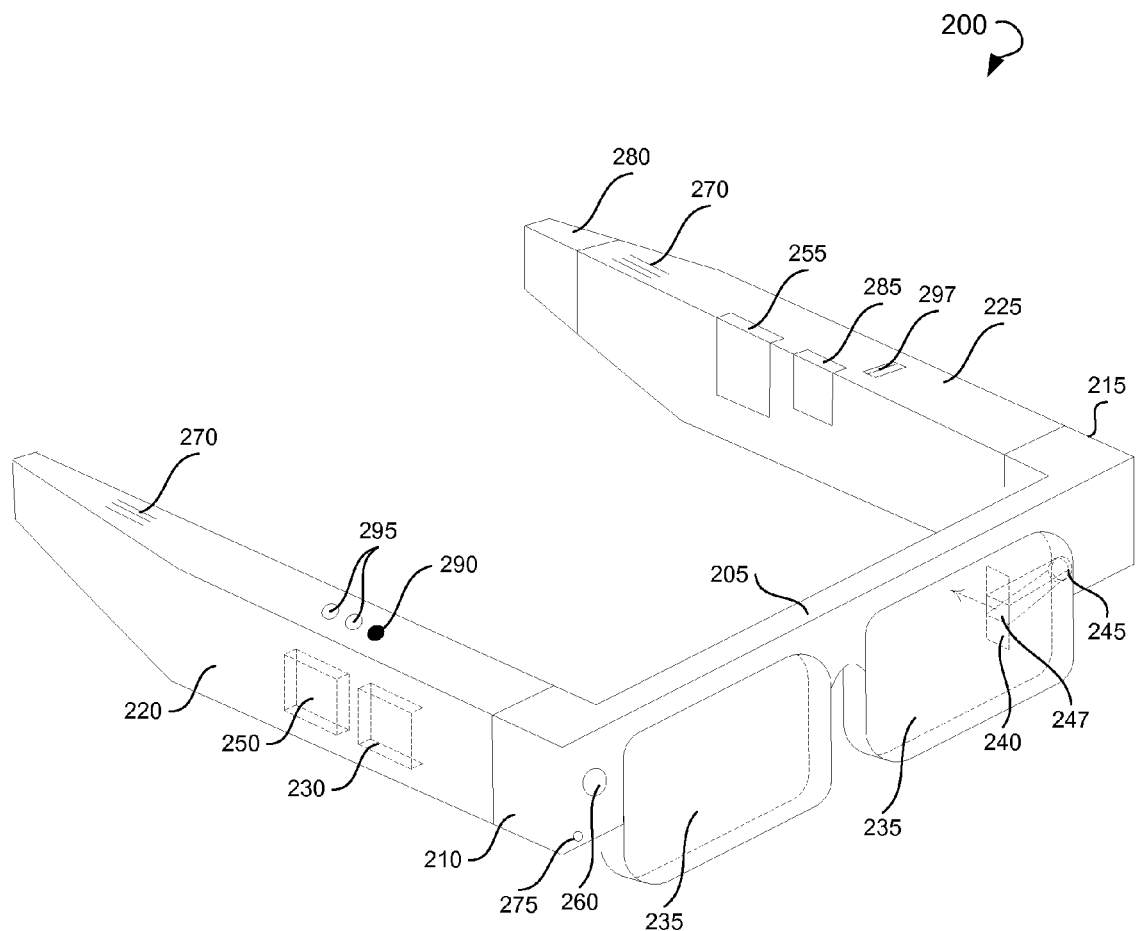
FIG. 2 is a schematic representation of an augmented reality eyeglass communication device for facilitating shopping, in accordance with an example embodiment.

FIG. 2 shows a schematic representation of an exemplary eyeglass communication device 200 for facilitating shopping. The device 200 may comprise a frame 205 having a first end 210 and a second end 215. The first end 210 of the frame 205 may be connected to a right earpiece 220. The second end 215 of the frame 205 may be connected to a left earpiece 225. The frame 205 may be configured as a single unit or may consist of several pieces. In an example embodiment, the frame 205 may consist of two pieces connected to each other by a connector (not shown). The connector may include two magnets, one on each piece of the frame 205. When two parts of the connector are connected, the connector may look like a nose bridge of ordinary eyeglasses.

The device 200 may comprise a processor 230 disposed in the frame 205, the right earpiece 220 or the left earpiece 225. The processor 230 may be configured to receive one or more commands of a user, perform operations associated with the commands of the user, receive product information, and process the product information. The processor 230 may operate on an operational system, such as iOS, Android, Windows Mobile, Blackberry, Symbian, Asha, Linux, Nemo Mobile, and so forth. The processor 230 may be configured to establish connection with a network to view text, photo or video data, maps, listen to audio data, watch multimedia data, receive and send e-mails, perform payments, etc. Additionally, the processor 230 may download applications, receive and send text, video, and multimedia data. In a certain embodiment, the processor 230 may be configured to process a hand gesture command of the user.

The device 200 may also comprise at least one display 235. The display 235 may be embedded into the frame 105. The frame 105 may comprise openings for disposing the display 235. In a certain embodiment, the frame 205 may be implemented without openings and may partially enclose two displays 235. The display 235 may be configured as an eyeglass lens, such as prescription lenses, non-prescription lenses, e.g., darkened lenses, safety lenses, lenses without diopters, and the like. The eyeglass lens may be changeable. The display 235 may be configured to display data received from the processor 230. The data received from the processor 230 may include video data, text data, payment data, personal data, barcode information, time data, notifications, and so forth. The display 235 may include an optical prism element 240 and a projector 245 embedded in the display 235. The display 235 may include a see-through material to display simultaneously a picture of real world and data requested by the user. In some embodiments, the display 235 may be configured so that the optical prism element 240 and the projector 245 cannot be seen when looking from any side on the device 200. Therefore, the user 105 wearing the device 200 and looking through displays 235 may not see the optical prism element 240 and the projector 245. The projector 245 may receive an image 247 from the processor 230 and may project the image 247 to the optical prism element 240. The optical prism element 240 may be configured so as to focus the image 247 to a retina of the user. In certain embodiments, the projector 245 may be configured to project the data received from the processor 230 to a surface in environment of the user. The surface in environment of the user may be any surface in environment of the user, such as a vertical surface, a horizontal surface, an inclined surface in environment of the user, a surface of a physical object in environment of the user, and a part of a body of the user. In some embodiments, the surface may be a wall, a table, a hand of the user, a sheet of paper. The data may include a virtual touch screen environment. The virtual touch screen environment may be see-through to enable the user to see the surroundings. Virtual objects in the virtual touch screen environment may be moveable and deformable. The user may interact with virtual objects visualized in the virtual touch screen environment. Thus, the device 200 may provide gesture tracking, surface tracking, code example tracking, and so forth.

In some embodiments, the device 200 may comprise a gesture sensor capable of measuring electrical activity associated with a muscle movement. Thus, the muscle movement may be detected and interpreted as a command.

The user may interact with the data and/or objects projected by the projector 245 (e.g. a rear projector system), such as the virtual touch screen. The camera 260 may capture images or video of user body parts in relation to the projected objects and recognize user commands provided via virtual control components. Alternatively, motions of user fingers or hands may be detected by one or more sensors and interpreted by the processor.

In some embodiments, the device 200 may comprise two cameras, one for each eye of the user. Each of the two cameras may have a 23 degree field of view.

In some embodiments, the projector 245 may be configured rotatable to enable the processor 245 to project an image to the optical prism element 240, as well as to a surface in environment of the user. In further embodiments, the image projected by the projector 245 may be refracted by an optical prism element embedded into a display 235 and directed to the surface in environment of the user. In some embodiments, the data projected by the projector to the optical prism element may be perceived by a human eye as located at a distance of 3 to 8 meters.

The device 200 may comprise a transceiver 250 electrically coupled to the processor 230. The transceiver 250 may be configured to receive and transmit data from a remote device over a wireless network, receive one or more commands of the user, and transmit the data and the one or more commands to the remote device. The remote device may include a store server, a communication server, a financial organization server, and so forth. The transceiver 250 may be disposed in the frame 205, the right earpiece 220, or the left earpiece 225.

In some embodiments, the device 200 may comprise a receiver configured to sense a change in frequency of a WiFi signal. The change may be caused by a move of a user hand. The change may be processed by the processor and a hand gesture associated with the change may be recognized and the corresponding command may be performed. For example, the command may include controlling temperature settings, adjusting a volume on a stereo, flipping a channel on a television set, or shutting off lights, causing a fireplace to blaze to life, and so forth. The change in frequency may be sensed in a line of sight of the user, outside the line of sight of the user, through a wall, and so forth. In some embodiments, the receiver sensing WiFi signal may be activated by a specific combination of gestures serving as an activating sequence or a password. In some embodiments, WiFi signal change may be sensed by a microphone.

In certain embodiments, the device 200 may comprise a SIM card slot 255 disposed in the frame 205, the right earpiece 220 or the left earpiece 225 and configured to receive a SIM card (not shown). The SIM card may store a phone number of the SIM card, an operator of the SIM card, an available balance of the SIM card, and so forth. Therefore, when the SIM card in received in the SIM card slot 255, the device 200 may perform phone communication functions, i.e. may function as a mobile phone, in particular, a smartphone.

In certain embodiments, the device 200 may comprise a camera 260 disposed on the frame 205, the right earpiece 220 or the left earpiece 225. The camera 260 may include one or more of the following: a digital camera, a mini-camera, a motion picture camera, a video camera, a still photography camera, and so forth. The camera 260 may be configured to take a photo or record a video, capture a sequence of images, such as the images containing a hand of the user. The camera 260 may communicate the captured photo or video to the transceiver 250. Alternatively, the camera 260 may transmit the images to the processor to recognize the hand gesture command. The camera 260 may be configured to perform simultaneously video recording and image capturing.

Figure 3:
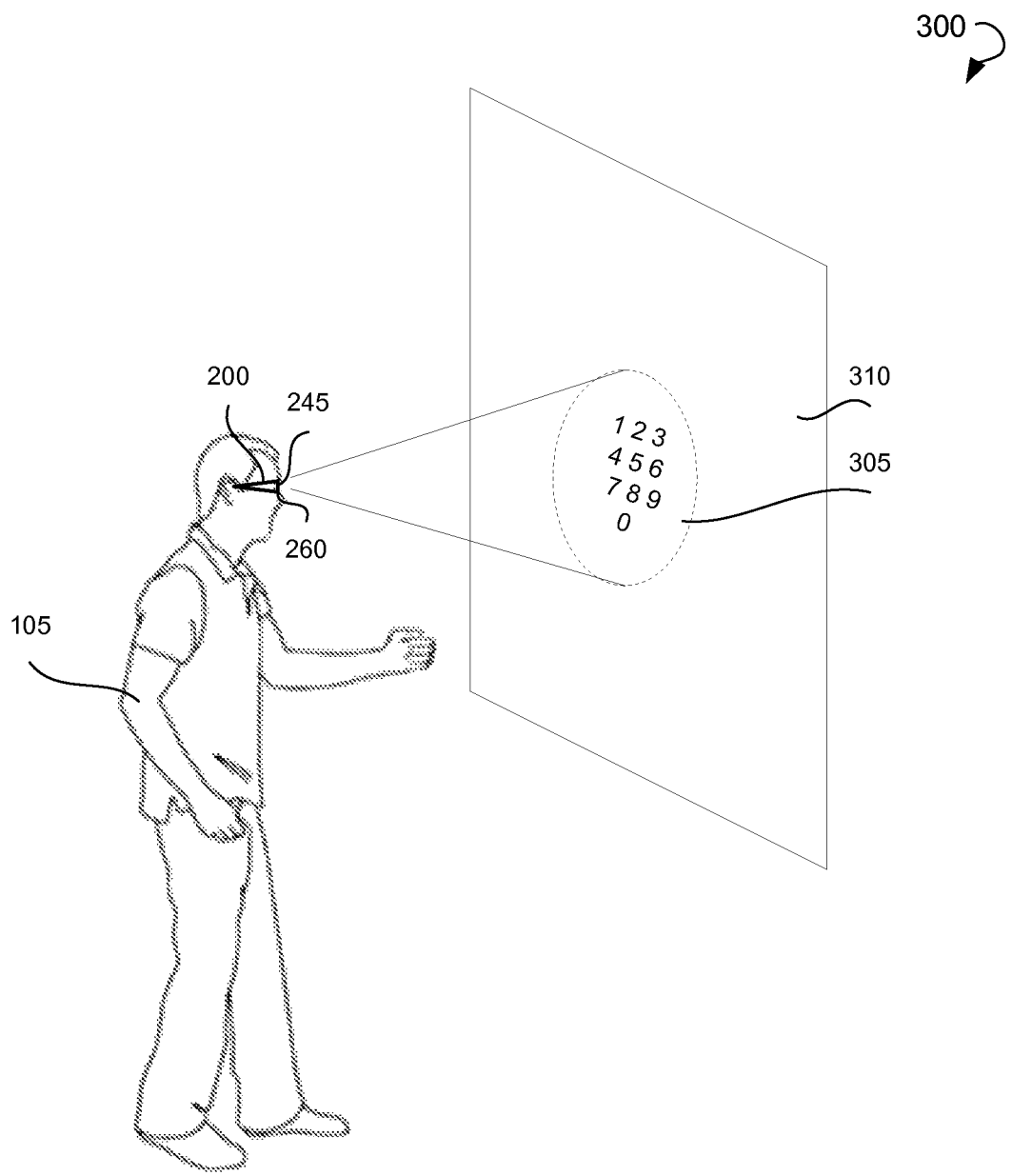
FIG. 3 shows a schematic representation of tracking a hand gesture command performed by an augmented reality eyeglass communication device.

FIG. 3 shows a schematic representation 300 of an embodiment of the device 200, in which the camera 260 may be configured to track a hand gesture command of the user 105. The tracked hand gesture command of the user may be communicated to a processor of the device 200. In this embodiment, the user 105 may give a command to perform a command call, e.g. by moving a user hand up. The camera 260 may track the hand gesture command of the user 105 and communicate data associated with the tracked data to the processor of the device 200. The processor may process the received data and may give a command to a projector 245 to project an image of a keyboard, i.e. a virtual keyboard 305, to a surface 310 in an environment of the user 105, e.g. to a wall or a user palm. The user 105 may point figures of a telephone number on the virtual keyboard 305. The camera 260 may detect the figured pointed by the user 105 and communicate the numbers to the processor. The processor may process the received figures and give a command to perform a command call.

Referring again to FIG. 2, the device 200 may comprise several cameras mounted on any side of the device 200 and directed in a way allowing capture of all areas around the device 200. For example, the cameras may be mounted on front, rear, top, left and right sides of the device 200. The areas captured by the front-, rear-, top-, left- and right-side cameras may be displayed on the display 235 simultaneously or one by one. Furthermore, the user may select, for example, by voice command, one of the cameras, and the data captured by the selected camera may be shown on the display 235. In further embodiments, the camera 260 may be configured to allow focusing on an object selected by the user, for example, by voice command.

The camera 260 may be configured to scan a barcode. Scanning a barcode may involve capturing an image of the barcode using the camera 260. The scanned barcode may be processed by the processor 230 to retrieve the barcode information. Using the camera 260 of device 200, the user may capture pictures of various cards, tickets, or coupons. Such pictures, stored in the device 200, may comprise data related to captured cards, tickets, or coupons.

One having ordinary skills in the art would understand that the term "scanning" is not limited to printed barcodes having particular formats, but can be used for barcodes displayed on a screen of a PC, smartphone, laptop, another wearable personal digital device (WPD), and so forth. Additionally, barcodes may be transmitted to and from the eyeglass communication device electronically. In some embodiments, barcodes may be in the form of an Electronic Product Code (EPC) designed as a universal identifier that provides a unique identity for every physical object (not just a trade item category) anywhere in the world. It should be noted that EPCs are not exclusively used with RFID data carriers. They can be constructed based on reading of optical data carriers, such as linear barcodes and two-dimensional barcodes, such as Data Matrix symbols. For purposes of this document, all optical data carriers are referred to herein as "barcodes".

In certain embodiments, the camera 260 may be configured to capture an image of a product. The captured image may be processed by the processor to retrieve image information. The image information may include a name of the product or a trademark of the product. Information associated with the product may be retrieved from the image information and displayed on the display 235.

In certain embodiments, the device 200 may comprise at least one earphone 270 disposed on the right earpiece 220 or the left earpiece 225. The earphone 270 may play sounds received by the transceiver 250 from the control device.

In certain embodiments, the device 200 may comprise a microphone 275. The microphone 275 may sense the voice command of the user and communicate it to the transceiver 250. The voice command may also include a voice memo, a voice message, and so forth. Additionally, the microphone 275 may sense other voice data and transmit the voice data to the processor.

In certain embodiments, the device 200 may comprise a charging unit 280 connected to the frame 205, the right earpiece 220 or the left earpiece 225. The charging unit 280 may be configured to provide power to elements of the device 200. In various embodiments, the charging unit may include one or more solar cells, a wireless charger accessory, a vibration charger configured to charge the devices using natural movement vibrations, and so forth.

Additionally, the device 200 may include at least one electroencephalograph (EEG) sensor configured to sense brain activity of the user. Neurons of the human brain can interact through a chemical reaction and emit a measurable electrical impulse. EEG sensors may sense the electrical impulses and translate the pulses into one or more commands. By sensing the electrical impulses, the device may optimize brain fitness and performance of the user, measure and monitor cognitive health and wellbeing of the user, and so forth.

In certain embodiments, the device 200 may comprise a memory slot 285 disposed on the frame 205, the right earpiece 220 or the left earpiece 225. The memory slot 285 may be configured to capture a memory unit (not shown). On a request of the user, the device 200 may display data stored in the memory unit of the device 200. In various examples, such data may include a photo or a video recorded by the camera 260, the information received from a remote device, payment information of the user in the form of a scannable barcode, discount or membership cards of the user, tickets, coupons, boarding passes, any personal information of the user, and so forth. The memory unit may include a smart media card, a secure digital card, a compact flash card, a multimedia card, a memory stick, an extreme digital card, a trans flash card, and so forth.

In certain embodiments, the device 200 may comprise at least one sensor (not shown) mounted to the frame 205, the right earpiece 220 or the left earpiece 225 and configured to sense the one or more commands of the user. The sensor may include at least one eye-tracking unit, at least one motion sensing unit, and an accelerometer determining an activity of the user. The eye-tracking unit may track an eye movement of the user, generate a command based on the eye movement, and communicate the command to the transceiver 250. The motion sensing unit may sense head movement of the user, i.e. motion of the device 200 about a horizontal or vertical axis. In particular, the motion sensing unit may sense motion of the frame 205, the right earpiece 220 or the left earpiece 225. The user may give commands by moving the device 200, for example, by moving the head of the user. The user may choose one or more ways to give commands: by voice using the microphone 275, by eye movement using the eye-tracking unit, by head movement using the motion sensing unit, for example, by nodding or shaking the head, or use all these ways simultaneously.

Additionally, the device 200 may comprise one or more biometric sensors to sense biometric parameters of the user. The biometric parameters may be stored to the memory and processed by the processor to receive historical biometric data. For example, the biometric sensors may include sensors for measuring a blood pressure, a pulse, a heart rate, a glucose level, a body temperature, an environment temperature, arterial properties, and so forth. The sensed data may be processed by the processor and/or shown on the display 235. Additionally, one or more automatic alerts may be provided based on the measuring, such as visual alerts, audio alerts, voice alerts, and so forth.

Moreover, to track user activity, the device 200 may comprise one or more accelerometers. Using the accelerometers, the various physical data related to the user may be received, such as calories burned, sleep quality, breaths per minute, snoring breaks, steps walked, distance walked, and the like. In some embodiments, using the accelerometers, the device 200 may control snoring by sensing the position of the user while he is asleep.

In certain embodiments, the device 200 may comprise a light indicator 290, and buttons 295, such as an on/off button and a reset button. In certain embodiments, the device 200 may comprise a USB slot 297 to connect to other devices, for example, to a computer.

Additionally, a gesture recognition unit including at least three dimensional (3D) gesture recognition sensors, a range finder, a depth camera, and a rear projection system may be included in the device 200. The gesture recognition unit may be configured to track hand gesture commands of the user. Moreover, non-verbal communication of a human (gestures, hand gestures, emotion signs, directional indications, and facial expressions) may be recognized by the gesture recognition unit, a camera, and/or other sensors. Multiple hand gesture commands or gestures of other humans may be identified simultaneously. In various embodiments, hand gesture commands or gestures of other humans may be identified based on depth data, finger data, hand data, and other data, which may be received from sensors of the device 200. The 3D gesture recognition sensor may capture three dimensional data in real time with high precision.

To identify a hand gesture, a human hand may be interpreted as a collection of vertices and lines in a 3D mesh. Based on relative position and interaction of the vertices and lines, the gesture may be inferred. To capture gestures in real time, a skeletal representation of a user body may be generated. To this end, a virtual skeleton of the user may be computed by the device 200 and parts of the body may be mapped to certain segments of the virtual skeleton. Thus, user gestures may be determined faster, since only key parameters are analyzed.

Additionally, deformable 2D templates of hands may be used. Deformable templates may be sets of points on the outline of human hands as linear simplest interpolation which performs an average shape from point sets, point variability parameters, and external deformators. Parameters of the hands may be derived directly from the images or videos using a template database from previously captured hand gestures.

Additionally, facial expressions of the user, including a blink, a wink, a surprise expression, a frown, a clench, a smile, and so forth, may be tracked by the camera 260 and interpreted as user commands. For example, user blinking may be interpreted by the device 200 as a command to capture a photo or a video.

Through recognition of gestures and other indication or expressions, the device 200 may enable the user to control, remotely or non-remotely, various machines, mechanisms, robots, and so forth. Information associated with key components of the body parts may be used to recognize gestures. Thus, important parameters, like palm position or joint angles, may be received. Based on the parameters, relative position and interaction of user body parts may be determined in order to infer gestures. Meaningful gestures may be associated with templates stored in a template database.

In other embodiments, images or videos of the user body parts may be used for gesture interpretation. Images or videos may be taken by the camera 260.

In certain embodiments, the device 200 may comprise a RFID reader (not shown) to read a RFID tag of a product. The read RFID tag may be processed by the processor 230 to retrieve the product information.

In certain embodiments, the device 200 may be configured to allow the user to view data in 3D format. In this embodiment, the device 200 may comprise two displays 235 enabling the user to view data in 3D format. Viewing the data in 3D format may be used, for example, when working with such applications as games, simulators, and the like. The device 200 may be configured to enable head tracking. The user may control, for example, video games by simply moving his head. Video game application with head tracking may use 3D effects to coordinate actual movements of the user in the real world with his virtual movements in a displayed virtual world.

In certain embodiments, the device 200 may comprise a vibration unit (not shown). The vibration unit may be mounted to the frame 205, the right earpiece 220 or the left earpiece 225. The vibration unit may generate vibrations. The user may feel the vibrations generated by the vibration unit. The vibration may notify the user about receipt of the data from the remote device, alert notification, and the like.

Additionally, the device 200 may comprise a communication circuit. The communication circuit may include one or more of the following: a Bluetooth module, a WiFi module, a communication port, including a universal serial bus (USB) port, a parallel port, an infrared transceiver port, a radiofrequency transceiver port, an embedded transmitter, and so forth. The device 200 may communicate with external devices using the communication circuit.

Thus, in certain embodiments, the device 200 may comprise a GPS unit (not shown). The GPS unit may be disposed on the frame 205, the right earpiece 220 or the left earpiece 225. The GPS unit may detect coordinates indicating a position of the user 105. The coordinates may be shown on the display 235, for example, on request of the user, stored in the memory unit 285, or sent to a remote device.

In certain embodiments, the device 200 may comprise a Wi-Fi module (not shown) and a Wi-Fi signal detecting sensor (not shown). The Wi-Fi signal detecting sensor may be configured to detect change of a Wi-Fi signal caused by the hand gesture command of the user and communicate data associated with the detected change to the processor 230. In this embodiment, the processor 230 may be further configured to process the data associated with the detected change of the Wi-Fi signal and perform the detected hand gesture command in accordance with the processed data. For example, a user may give a command to turn off the light in the room, e.g., by moving a user hand up and down. The Wi-Fi signal changes due to movement of the user hand. The Wi-Fi signal detecting sensor may detect change of the Wi-Fi signal and communicate data associated with the detected change to the processor 230. The processor 230 may process the received data to determine the command given by the user and send a command to a light controlling unit of the room to turn off the light.

Using the embedded transmitter, the device 200 may produce signals used to control a device remotely (e.g. TV set, audio system, and so forth), to enable a two way radio alert, a medical care alert, a radar, activate a door opener, control an operation transporting vehicle, a navigational beacon, a toy, and the like.

In some embodiments, device 200 may include control elements to control operation or functions of the device.

Access to the device 200 may be controlled by a password, a Personal Identification Number (PIN) code, and/or biometric authorization. The biometric authorization may include fingerprint scanning, palm scanning, face scanning, retina scanning, and so forth. The scanning may be performed using one or more biometric sensors. Additionally, the device 200 may include a fingerprint reader configured to scan a fingerprint. The scanned fingerprint may be matched to one or more approved fingerprints and if the scanned fingerprint corresponds to one of the approved fingerprints, the access to the device 200 may be granted.

Additionally, a Software Development Kit (SDK) and/or an Application Programming Interface (API) may be associated with the device 200. The SDK and/or API may be used for third party integration purposes.

In various embodiments, the device 200 may comprise a GPS module to track geographical location of the device, an alert unit to alert the user about some events by vibration and/or sound, one or more subscriber identification module (SIM) cards, one or more additional memory units, a physical interface (e.g. a microSecureDigital (microSD) slot) to receive memory devices external to the device, a two-way radio transceiver for communication purposes, and an emergency button configured to send an alarm signal. In some embodiments, the vibration and sound of the alert unit may be used by a guide tool and an exercise learning service.

In certain example embodiments, device may be configured to analyze one or more music records stored in a memory unit. The device may communicate, over a network, with one or more music providers and receive data on music records suggested by the music providers for sale which are similar to the music records stored in the memory unit of the device. The received data may be displayed by the device.

Additionally, the processor may be configured to communicate with a gambling cloud service or a gaming cloud service, exchange gambling or gaming data with the gambling cloud service or the gaming cloud service, and, based on a user request, transfer payments related to gambling or gaming using payment data of the user associated with an account of the user in the cloud service, using payment data of the user stored in a memory unit or using a swipe card reader to read payment card data.

Figure 4:
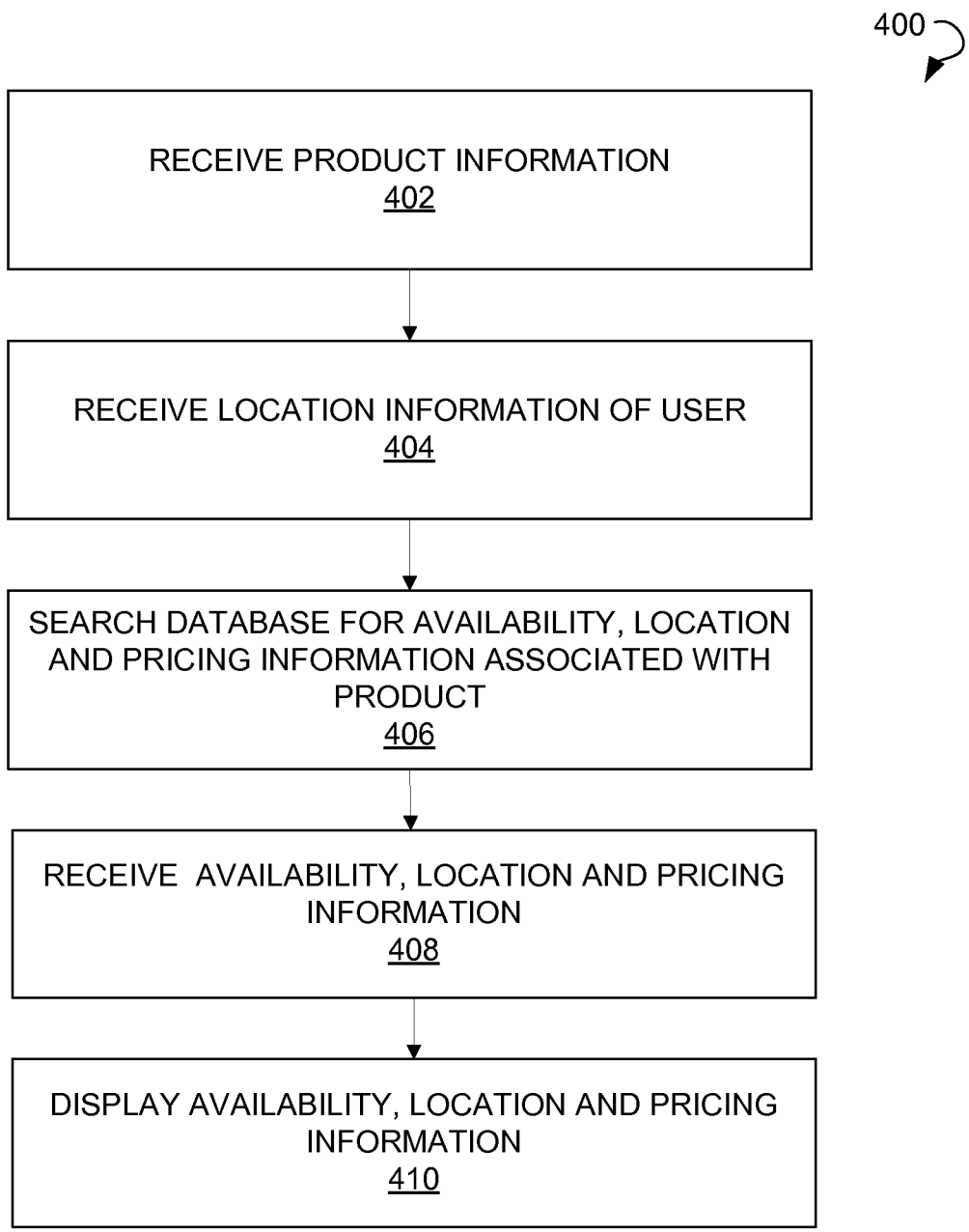
FIG. 4 is a flow chart illustrating a method for facilitating shopping using an augmented reality eyeglass communication device, in accordance with an example embodiment.

FIG. 4 is a flow chart illustrating a method 400 for facilitating shopping using an augmented reality eyeglass communication device 200. The method 400 may start with receiving product information associated with products comprised in a list of products of a user at operation 402. The product information, e.g., names or types of the products, may be received by a processor 230 of the device 200 by sensing a command of the user. In a certain embodiment, the user may pronounce names of products the user wishes to buy and may give a voice command to include these products into the list of products. The device 200 may sense the voice command of the user via a microphone 275 and communicate the command to the processor 230. The processor 230 may receive location information associated with location of the user at operation 404.

At operation 406, the processor 230 may search a database associated with a store for availability, location and pricing information associated with the products included into the list of products of the user. The search may be based on the product information. The store may include any store in proximity to location of the user or any store selected by the user. At operation 408, the processor 230 may receive the availability, location and pricing information associated with the product from the database of the store. The availability, location and pricing information associated with the product may be displayed to the user on a display 235 of the device 200 at operation 410.

Optionally, the method 400 may comprise plotting, by the processor 230, a route for the user on a map of the store based on the availability, location and pricing information associated with the product and the location information associated with the location of the user. The route may be displayed on the display 235.

In a certain embodiment, the user may give a command to provide description of a product present in the store. The device 200 may sense the command of the user via the microphone and communicate the command to the processor 230 of the device 200. The processor 230 may receive information associated with the product which description is requested by the user. The information associated with the product may be received by means of taking a picture of the product, scanning a barcode of the product, and reading a RFID tag of the product. The received information associated with the product may be processed by the processor 230. Then, the processor may search, based on the received information associated with the product, the description of the product in a database available in a network, e.g., in the Internet. After receiving, by the processor, the description of the product from the network, the description of the product present in the store may be displayed to the user on the display 235.

In a certain embodiment, the user may give a command to provide description of a product by means of a hand gesture, for example, by moving a hand of the user from left to right. In this embodiment, the method 400 may comprise tracking, by a camera of the device 200, a hand gesture command of the user. The hand gesture command of the user may be processed by a processor of the device 200. The processor may give a command to a projector of the device 200 to project the description of the product to a surface in environment of the user, e.g. a wall or the product itself, according to the hand gesture command.

In a certain embodiment, the processor 230 may optionally receive information about the products put by the user into a shopping cart. The information about the products may be received by means of taking a picture of the product, scanning a barcode of the product, and reading a RFID tag of the product. The processor 230 may remove, based on the received information, the products put by the user into the shopping cart from the list of products.

In case a product comprised in the list of products of the user is not available in the store, the device 200 may notify the user about such an absence, for example, by means of a sound or vibration notification or by means of showing the notification on the display 235. Furthermore, the processor 230 may search availability information associated with the not available product in a database of a store located proximate to the location of the user, based on location information of the user.

In a certain embodiment, the processor 230 may search the database associated with the store for information about a product having the same characteristics as the not available product. After the processor 230 receives the information about the product having the same characteristics as the not available product, the information may be displayed to the user on the display 235.

In a certain embodiment, when all products the user needs are put into the shopping chart, the user may give a command to perform a payment. The processor 230 may receive information about the products put by the user into the shopping cart and, based on the received information, may generate a payment request. The generated payment request may be sent, by means of the transceiver 250, to a financial organization to perform a payment. The financial organization may include a bank. The financial organization may confirm the payment, for example, based on SIM information of the user received together with the payment request or any other information associated with the device 200 and stored in a database of the financial organization. One example embodiment of the method 300 in respect of facilitating shopping will now be illustrated by FIG. 5.

Figure 5:
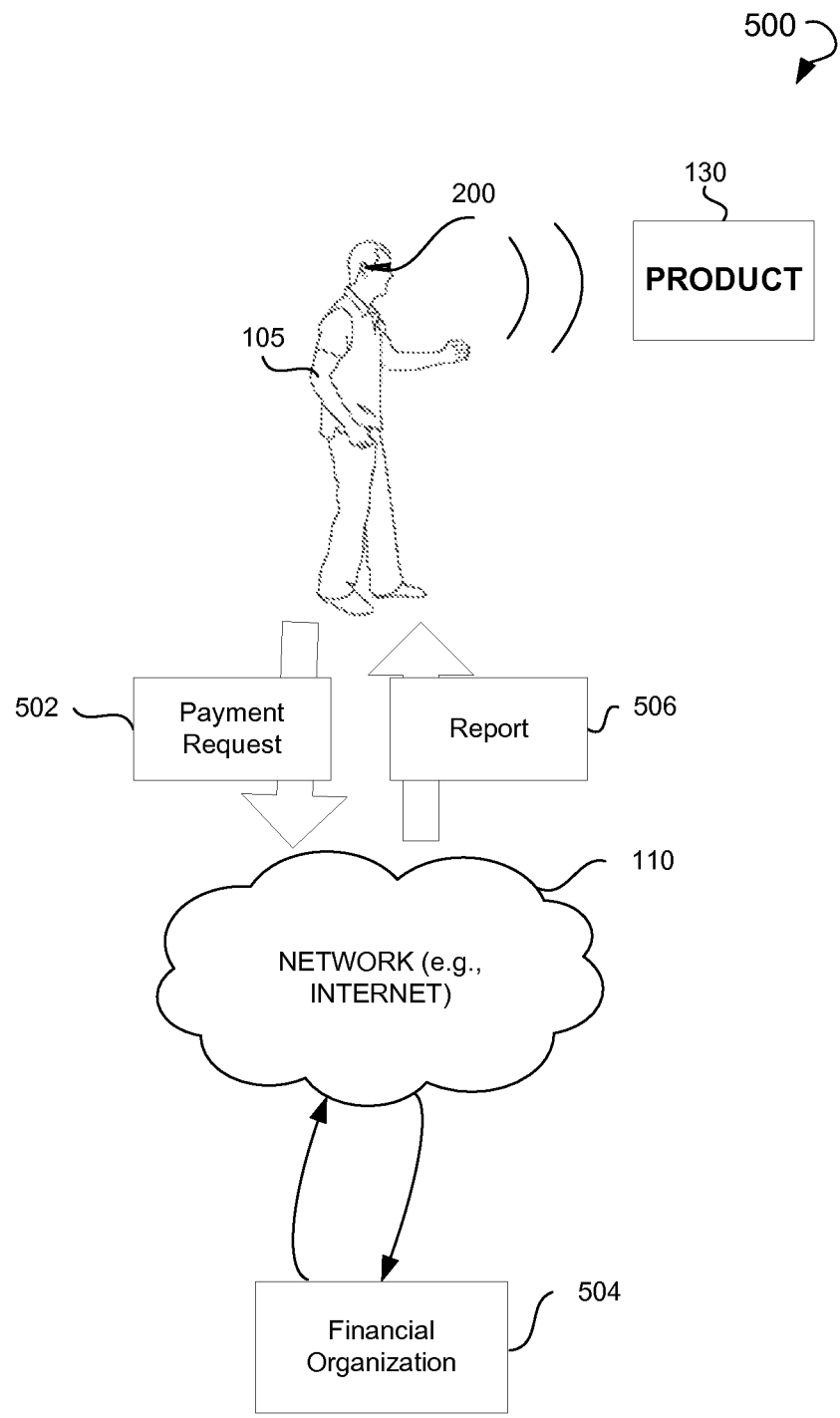
FIG. 5 shows a payment performed by an augmented reality eyeglass communication device, in accordance with an example embodiment.

FIG. 5 shows payment 500 using a payment card, in accordance with some embodiments. The user 105 may give a command, for example, by voice or by eye movement, to scan a barcode of a product 130. The device 200 may scan the barcode of the product 130 by means of a camera. After scanning the barcode of the product 130, the user 105 may receive payment data associated with the product 130. The payment data may encode payment request information, such as receiving account, amount to be paid, and so forth. However, in some embodiments, the amount to be paid may be provided by the user 105.

To pay for the product 130, the user may choose to pay electronically using the payment data stored on the device 200 or by a payment card. To pay using the payment card, the user 105 may dispose the payment card in front of the camera of the device 200. In a certain embodiment, information about the payment card may be stored in a memory unit of the device 200 or may be reached via the Internet. After capturing the image of the payment card by the camera, the device 200 may receive payment data associated with the payment card. The device 200 may generate a payment request 502 based on the payment data of the payment card and the payment data of the product 130.

The payment request 502 may be then sent via the network 110 to the financial organization 504 associated with the payment data of the payment card. The financial organization 504 may process the payment request 502 and may either perform the payment or deny the payment. Then, a report 506 may be generated and sent to the device 200 via the network 110. The report 506 may inform user 105 whether the payment succeeded or was denied. The user 105 may be notified about the report 506 by showing the report 506 on the display of the device 200, playing a sound in earphones of the device 200, or by generating a vibration by a vibration unit of the device 200.

Additionally, the user 105 may receive payments from other users via the device 200. Payment data associated with another user may be received by the device 200. The payment data may include payment account information associated with another user, payment transfer data, and so forth. Based on the payment data, an amount may be transferred from the payment account of another user to a payment account of the user. The information on the payment account of the user may be stored in the memory of the device 200 or on a server.

In some embodiments, the device 200 may be used for different purposes. For example, the device may enable hands free check-in and/or check-out, hands free video calls, and so forth. Additionally, the device may perform hands free video calls, take pictures, record video, get directions to a location, and so forth. In some embodiments, the augmented reality eyeglass communication device may make and receive calls over a radio link while moving around a wide geographic area via a cellular network, access a public phone network, send and receive text, photo, and video messages, access internet, capture videos and photos, play games, and so forth.

The augmented reality eyeglass communication device may be used to purchase products in a retail environment. To this end, the augmented reality eyeglass communication device, on receiving a user request to read one or more product codes, may read the product codes corresponding to products. The reading may include scanning the product code by the augmented reality eyeglass communication device and decoding the product code to receive product information. The product information may include a product price, a manufacture date, a manufacturing country, or a quantity of products. Prior to the reading, an aisle location of products may be determined. Each reading may be stored in a list of read products on the augmented reality eyeglass communication device. Additionally, the user may create one or more product lists.

In some embodiments, a request to check a total amount and price of the reading may be received from the user. Additionally, the user may give a command to remove some items from the reading, so some items may be selectively removed.

Data associated with the product information may be transmitted to a payment processing system. On a user request, the augmented reality eyeglass communication device may calculate the total price of the reading, and payment may be authorized and the authorization may be transmitted to the payment processing system. The payment processing system may perform the payment and funds may be transferred to a merchant account. Alternatively, the total price may be encoded in a barcode and the barcode may be displayed on a display of the augmented reality eyeglass communication device. The displayed barcode may be scanned by a sales person to accelerate check out.

Additionally, compensation may be selectively received based on predetermined criteria. For example, the compensation may include a cashback, a discount, a gift card, and so forth.

In certain embodiments, the user may pay with a restored payment card by sending a request to make payment via an interface of the augmented reality eyeglass communication device. The payment card may include any credit or debit card.

In some cases, the augmented reality eyeglass communication device may connect to a wireless network of a merchant to receive information, receive digital coupons and offers to make a purchase, receive promotional offers and advertising, or for other purposes. In various embodiments, promotional offers and advertising may be received from a merchant, a mobile payment service provider, a third party, and so forth.

After a purchase is made, a digital receipt may be received by email. The digital receipt may contain detailed information on cashback, discount, and so forth. Furthermore, a remote order for home delivery of one or more unavailable products may be placed with a merchant.

Another possible use of the augmented reality eyeglass communication device is accessing game and multimedia data. A user request to display the game and multimedia data or perform communication may be received and the augmented reality eyeglass communication device communicate, over a network, with a game and multimedia server to transfer game and multimedia data or a communication server to transfer communication data. The transferred data may be displayed on a display of the augmented reality eyeglass communication device. Furthermore, a user command may be received and transferred to the game and multimedia server, the server may process the command and transfer data related to the processing to the augmented reality eyeglass communication device.

Additionally, the augmented reality eyeglass communication device may receive incoming communication data and notify the user about the incoming communication data. To notify the user, an audible sound may be generated. The sound may correspond to the incoming communication data. A user command may be received in response to the incoming communication data, and the incoming communication data may be displayed.

In some embodiments, the game and multimedia data or the incoming communication data may be transferred to a television set, a set-top box, a computer, a laptop, a smartphone, a wearable personal digital device, and so forth.

The augmented reality eyeglass communication device may be used to alert a driver and prevent the driver for falling asleep. The augmented reality eyeglass communication device may include a neuron sensor and camera to detect the state of an eye of the driver (open or not) by processing frontal or side views of the face images taken by the camera to analyze slackening facial muscles, blinking pattern and a period of time the eyes stay closed between blinks. Once it is determined that the driver is asleep, an audible, voice, light, and/or vibration alarm may be generated.

Furthermore, the augmented reality eyeglass communication device may be used for personal navigation. The augmented reality eyeglass communication device may comprise a GPS unit to determine a geographical location of a user and a magnetic direction sensor to determine an orientation of a head of the user. The processor of the augmented reality eyeglass communication device may receive a destination or an itinerary, one or more geographical maps, the geographical location of the user, and the orientation of the head of the user, and generate navigation hints. The navigation hints may be provided to the user via a plurality of Light Emitting Diodes (LEDs). The LEDs may be disposed in a peripheral field of vision of the user and provide navigation hints by changing their color. For example, the LEDS located on in the direction where the user need to move to reach the destination or to follow the itinerary, may have a green color, while the LEDs located in a wrong direction may have a red color. Additionally, data including the itinerary, the one or more geographical maps, the geographical location of the user, one or more messages, one or more alternative routes, one or more travel alerts, and so forth may be displayed on the display of the augmented reality eyeglass communication device.

In some embodiments, the augmented reality eyeglass communication device may receive user commands via a microphone.

In some embodiments, the augmented reality eyeglass communication device may comprise at least one electroencephalograph (EEG) sensor sensing one or more electrical impulses associated with the brain activity of the user. The electrical impulses may be translated in one or more commands. Additionally, the electrical impulses may be used to detect and optimize brain fitness and performance of the user, measure and monitor cognitive health and well being of the user. Based on the electrical impulses undesired condition of the user may be detected and an alert associated with the undesired condition may be provided. The undesired condition may include chronic stress, anxiety, depression, aging, decreasing estrogen level, excess oxytocin level, prolonged cortisol secretion, and so forth.

Moreover, healthy lifestyle tips may be provided to the user via the augmented reality eyeglass communication device. The healthy lifestyle tips may be associated with mental stimulation, physical exercise, healthy nutrition, stress management, sleep, and so forth.

Figure 6:
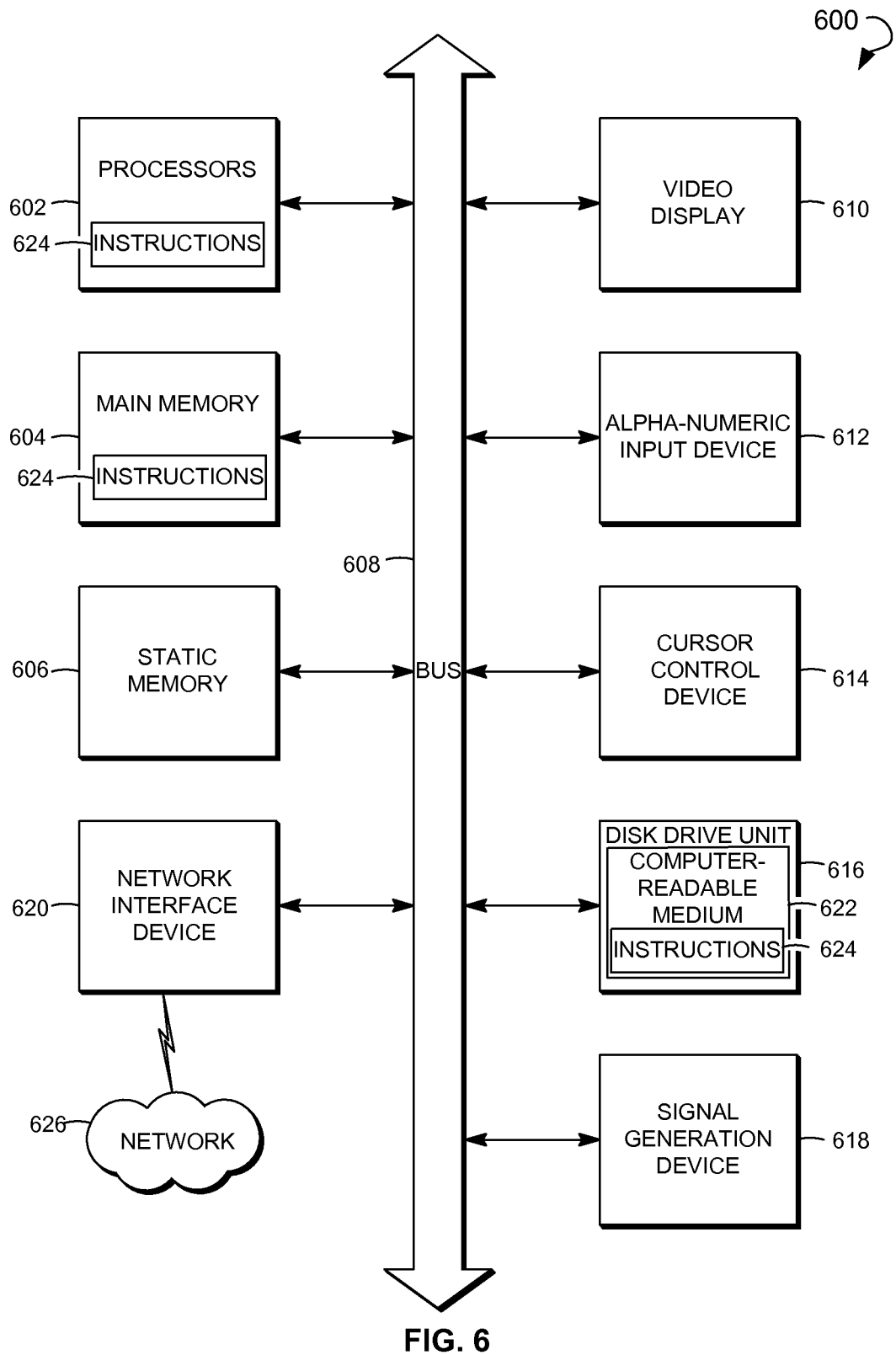
FIG. 6 is a schematic diagram illustrating an example of a computer system for performing any one or more of the methods discussed herein.

FIG. 6 shows a diagrammatic representation of a machine in the example electronic form of a computer system 600, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor or multiple processors 602 (e.g., a central processing unit (CPU), a graphics processing unit (GPU), or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 may also include an alphanumeric input device 612 (e.g., a keyboard), a cursor control device 614 (e.g., a mouse), a disk drive unit 616, a signal generation device 618 (e.g., a speaker) and a network interface device 620.

The disk drive unit 616 includes a computer-readable medium 622, on which is stored one or more sets of instructions and data structures (e.g., instructions 624) embodying or utilized by any one or more of the methodologies or functions described herein. The instructions 624 may also reside, completely or at least partially, within the main memory 604 and/or within the processors 602 during execution thereof by the computer system 600. The main memory 604 and the processors 602 may also constitute machine-readable media.

The instructions 624 may further be transmitted or received over a network 626 via the network interface device 620 utilizing any one of a number of well-known transfer protocols (e.g., Hyper Text Transfer Protocol (HTTP)).

While the computer-readable medium 622 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAMs), read only memory (ROMs), and the like.

The example embodiments described herein may be implemented in an operating environment comprising software installed on a computer, in hardware, or in a combination of software and hardware.

Thus, various augmented reality eyeglass communication devices for facilitating shopping and methods for facilitating shopping using an augmented reality eyeglass communication device have been described. Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

What is claimed is:

1. An augmented reality eyeglass communication device comprising:
   an eyeglass frame having a first end and a second end;
   a right earpiece and a left earpiece, wherein the right earpiece is connected to the first end of the frame and the left earpiece is connected to the second end of the frame;
   a camera disposed on the frame, the right earpiece or the left earpiece, the camera being configured to:
      track a hand gesture command of a user,
      capture a sequence of images containing a finger of the user and virtual objects of a virtual keypad displayed by the eyeglass communication device and operable to provide input to the eyeglass communication device by the user, finger motions in relation to virtual objects being detected based on the sequence, wherein one or more gestures are recognized based on the finger motions, wherein the one or more gestures define user commands input to the eyeglass communication device,
      capture a skeletal representation of a body of the user, a virtual skeleton being computed based on the skeletal representation, and body parts being mapped to segments of the virtual skeleton, wherein the capturing is performed in real time,
   a processor disposed in the frame, the right earpiece or the left earpiece and configured to:
      receive one or more hand gesture commands of the user, wherein the one or more hand gesture commands comprise displaying product information comprising product description and product pricing of one or more products fetched from a networked database in response to user input of identifiers of the one or more products into the processor and displaying location information associated with the one or more products determined by the eyeglass communication device, including displaying a route on a map of a store to guide the user to the location within the store to obtain the product, and changing the frequency of a WiFi signal of the eyeglass communication device,
      perform the one or more hand gesture commands of the user,
      process the one or more hand gesture commands tracked by the camera, the hand gesture command being inferred from a collection of vertices and lines in a three dimensional mesh associated with a hand of the user,
derive parameters from the hand gesture command using a template database, the template database storing captured storing deformable two dimensional templates of a human hand, a deformable two dimensional template of the human hand being associated with a set of points on outline of the human hand;
receive product information, and
process the product information;
at least one display connected to the frame and configured to display data received from the processor corresponding to each of the one or more hand gesture commands, the display comprising:
an optical prism element embedded in the display, and
a projector embedded in the display, the projector being configured to project the data received from the processor to the optical prism element and to project the data received from the processor to a surface in environment of the user, the data including a virtual touch screen environment;
a transceiver electrically coupled to the processor and configured to receive and transmit data over a wireless network;
a Subscriber Identification Module (SIM) card slot disposed in the frame, the right earpiece or the left earpiece and configured to receive a SIM card;
at least one earphone disposed on the right earpiece or the left earpiece;
a microphone configured to sense a voice command of the user, wherein the voice command is operable to perform commands of the one or more hand gestures commands; and
a charging unit connected to the frame, the right earpiece or the left earpiece;
at least one electroencephalograph sensor configured to sense brain activity of the user and provide an alert when undesired brain activity is sensed;
a gesture recognition unit including at least three dimensional gesture recognition sensors, a range finder, a depth camera, and a rear projection system, the gesture recognition unit being configured to track the hand gesture command of the user, the hand gesture command being processed by the processor, wherein the hand gesture command is associated with the vertices and lines of the hand of the user, the vertices and lines being in a specific relation;
a band configured to secure the augmented reality eyeglass communication device on a head of the user;
wherein the augmented reality eyeglass communication device is configured to perform phone communication functions, and wherein the eyeglass communication device is operable to calculate a total price for the one or more products, encode the total price into a code that is scannable by a merchant scanning device, and wherein the eyeglass communication device is operable to communicate with the merchant scanning device and perform a payment transaction for the one or more products.

2. The device of claim 1, further comprising a sensor, wherein the sensor includes a motion sensing unit configured to sense head movement of the user, and an eye-tracking unit configured to track eye movement of the user.

3. The device of claim 1, wherein the voice command includes a voice memo, and a voice message.

4. The device of claim 1, wherein the microphone is configured to sense voice data and to transmit the voice data to the processor.

5. The device of claim 1, wherein the charging unit includes one or more solar cells configured to charge the device, a wireless charger accessory, and a vibration charger configured to charge the devices using natural movement vibrations.

6. The device of claim 1, wherein the user interacts with the data projected to the surface in environment, the interaction being performed through the hand gesture command.

7. The device of claim 1, wherein the gesture recognition unit is configured to identify multiple hand gesture commands of the user or gestures of a human, hand gesture commands of the user or gestures of a human including depth data, finger data, and hand data.

8. The device of claim 1, wherein the processing of the hand gesture command includes correlating of the hand gesture command with a template from a template database.

9. The device of claim 1, wherein the rear projector system is configured to project the virtual touch screen environment in front of the user, the hand gesture command being captured combined with the virtual touch screen environment.

10. The device of claim 1, wherein the display is configured as a prescription lens, a non-prescription lens, a safety lens, a lens without diopters, or a bionic contact lens, the bionic contact lens including integrated circuitry for wireless communication.

11. The device of claim 1, wherein the display includes a see-through material to display simultaneously a picture of real world and data requested by the user.

12. The device of claim 1, wherein the camera is configured to capture front-, rear-, top-, left- or right-side area around the device.

13. The device of claim 1, wherein the camera is configured to simultaneously perform video recording and image capturing.

14. The device of claim 1, the device further comprising one or more of the following: a memory slot, a memory unit inserted into the memory slot, a vibration unit, a Universal Serial Bus (USB) slot, a light indicator, an on/off button, a reset button, an accelerometer determining an activity of the user, and a GPS unit disposed on the frame, the right earpiece or the left earpiece.

15. The device of claim 1, wherein the processor operates on an operational system, wherein the operating system includes iOS, Android, Windows Mobile, Asha, Linux, Nemo Mobile, Blackberry, Symbian, and other operating systems.

16. The device of claim 1, wherein the processor is configured to establish connection with a network to view text, photo or video data, maps, listen to audio data, watch multimedia data, receive and send e-mails, and perform payments.

17. The device of claim 1, wherein the camera is configured to scan a barcode, the scanned barcode being processed by the processor to retrieve payment information and product information encoded in the barcode and enable self-checkout.

18. The device of claim 1, wherein the camera is configured to capture an image of a product, the captured image being processed by the processor to retrieve the product information.

19. The device of claim 1, further comprising a RFID reader to read a RFID tag of a product, the read RFID tag being processed by the processor to retrieve the product information.

20. The device of claim 1, wherein the surface in environment of the user includes a vertical surface in environment of the user, a horizontal surface in environment of the user, an inclined surface in environment of the user, a surface of a physical object in environment of the user, and a part of a body of the user.

21. The device of claim 1, further comprising a Wi-Fi module and a Wi-Fi signal detecting sensor, wherein the Wi-Fi signal detecting sensor is configured to detect change of a Wi-Fi signal caused by the hand gesture command of the user and communicate data associated with the detected change to the processor.

22. The device of claim 21, wherein the processor is further configured to:
process the data associated with the detected change of the Wi-Fi signal; and
perform the detected hand gesture command in accordance with the processed data.

23. The device of claim 1, wherein the device synchronizes with one or more external devices in real time, tracks a geographical location of the one or more external devices in real time, and provides communication capabilities using an embedded emergency button configured to give a medical alert signal, a request for help signal, or another informational signal.

24. The device of claim 1, wherein the device is used as a hands-free mobile computing device.

25. The device of claim 1, wherein the gesture recognition unit is configured to track non-verbal communication of a human, the non-verbal communication including one or more of the following: a gesture, a sign, a directional indication, and a facial gesture.

26. The device of claim 1, wherein the at least one electroencephalograph (EEG) sensor senses one or more electrical impulses associated with the brain activity, the one or more electrical impulses being translated in one or more commands.

27. The device of claim 26, wherein the one or more electrical impulses are used to optimize brain fitness and performance of the user, measure and monitor cognitive health and well being of the user.

28. The device of claim 1, wherein the camera and EEG sensors are configured to track one or more facial expressions of the user, the one or more facial expressions including a blink, a wink, a surprise expression, a frown, a clench, and a smile.

29. The device of claim 1, wherein the camera is configured to track a blinking of the user, the blinking being associated with video recording and image capturing.

30. The device of claim 1, further comprising an embedded transmitter configured to produce one or more signals, the one or more signals being associated with a remote radio control, a two way radio alert, a medical care alert, a radar, a door opener, an operation transporting vehicle, a navigational beacon, and a toy.

31. The device of claim 1, further comprising a communication circuit, the communication circuit including one or more of the following: a Bluetooth module, a WiFi module, a communication port including a universal serial bus (USB) port, a parallel port, an infrared transceiver port, a radiofrequency transceiver port, wherein the device communicates with external devices using the communication circuit.

32. The device of claim 1, further comprising one or more control elements to control operation or functions of the device.

33. The device of claim 1, further comprising one or more biometric sensors to sense biometric parameters of the user, the biometric parameters being stored to memory and processed by the processor to receive historical biometric data.

34. The device of claim 33, wherein the one or more biometric sensors include sensors for measuring one or more of the following: a blood pressure, a pulse, a heart rate, a glucose level, a body temperature, an environment temperature, and arterial properties, the measuring shown on the display.

35. The device of claim 34, wherein one or more automatic alerts are provided based on the measuring, the one or more automatic alerts including visual alerts, audio alerts, and voice alerts.

36. The device of claim 1, further comprising one or more accelerometers to track activity of the user, the activity of the user including calories burned, sleep quality, breaths per minute, snoring breaks, steps walked, and distance walked.

37. The device of claim 36, wherein the device controls snoring by sensing a position of the user using the one or more accelerometers.

38. The device of claim 1, wherein the device is compatible with one or more of the following network standards: GSM, CDMA, LTE, IMS, Universal Mobile Telecommunication System (UMTS), RFID, 4G, 5G, 6G and upper.

39. The device of claim 1, wherein the processor is further configured to download applications, receive and send text, video, multimedia data.

40. The device of claim 1, wherein device is used as a standalone system operating via a WiFi module or a Subscriber Identity Module (SIM) card.

41. The device of claim 1, wherein the three dimensional gesture recognition sensors capture three dimensional data in real time, the three dimensional data being millimeter exact.

42. The device of claim 1, wherein the virtual touch screen environment is see-through.

43. The device of claim 1, wherein virtual objects in the virtual touch screen environment are moveable and deformable, wherein moves and deformations may be performed based on motions of the user hand.

44. The device of claim 1, wherein the data projected by the projector to the optical prism element is perceived by a human eye as located at a distance of 3 to 8 meters.

45. The device of claim 1, wherein the device provides gesture tracking, surface tracking, and code example tracking.

46. The device of claim 1, wherein the user interacts with virtual objects visualized in the virtual touch screen environment.

47. The device of claim 1, further comprising two cameras, one for each eye of the user, each of the two cameras having a 23 degree field of view.

48. The device of claim 1, wherein the camera is configured to capture a sequence of images, the images containing a hand of the user, the images being processed by the processor to recognize the hand gesture command.

49. The device of claim 1, further comprising a receiver configured to sense a change in frequency of a WiFi signal, wherein the change is caused by a move of a user hand, the change being processed by the processor and associated with a command.

50. The device of claim 49, wherein the command includes controlling temperature settings, adjusting a volume on a stereo, flipping a channel on a television set, or shutting off a lights, and causing a fireplace to blaze to life.

51. The device of claim 49, wherein the change in frequency is sensed in a line of sight of the user, outside the line of sight of the user, and through a wall.

52. The device of claim 49, wherein the sensing is activated by a combination of gestures.

53. The device of claim 49, wherein the sensing is performed by the microphone.

54. The device of claim 1, further comprising a camera lens configured to track eye movements, the eye movements being interpreted as a command, the command including a scrolling command, a swiping command.

55. The device of claim 1, further comprising a gesture sensor configured to measure electrical activity associated with a muscle movement, wherein the muscle movement is interpreted as a command, the command being associated with wireless control of video games, phones, drones, vehicles, and other digital products.

56. The device of claim 1, wherein access to the device is controlled by one or more of the following: a password, a Personal Identification Number (PIN) code, and biometric authorization, the biometric authorization including fingerprint scanning, palm scanning, face scanning, and retina scanning, wherein the scanning is performed using one or more biometric sensors.

57. The device of claim 56, further comprising a fingerprint reader configured to scan a fingerprint, the scanned fingerprint being matched to one or more approved fingerprints, wherein the access to the device is granted based on the matching.

58. The device of claim 1, further comprising:
a GPS module configured to track geographical location of the device;
an alert unit configured to alert the user about one or more events by one or more of the following: vibration and sound;
one or more subscriber identification module (SIM) cards;
one or more additional memory units;
a physical interface configured to receive memory devices external to the device, wherein the physical interface includes a microSecureDigital (microSD) slot;
a two-way radio transceiver for communication purposes; and
an emergency button configured to send an alarm signal.

59. The device of claim 58, wherein the vibration and sound of the alert unit may be used by a guide tool and an exercise learning service.

60. The device of claim 1, wherein the device is configured to analyze one or more music records stored in a memory unit, communicate, over a network, with one or more music providers, and display data about music records suggested by the music providers for sale, wherein the data displayed include music records being similar to the music records stored in the memory unit of the device.

61. The device of claim 1, wherein the processor is configured to communicate with a gambling cloud service or a gaming cloud service, exchange gambling or gaming data with the gambling cloud service or the gaming cloud service, and, based on a user request, transfer payments related to gambling or gaming using payment data of the user associated with an account of the user in the cloud service, using payment data of the user stored in a memory unit or using a swipe card reader to read payment card data.

62. The device of claim 1, wherein the device is configured to perform functions of a phone and a computer.

63. A method for facilitating shopping using an augmented reality eyeglass communication device, the augmented reality eyeglass communication device comprising the augmented reality eyeglass communication device of claim 1, and the method comprising:
receiving, by a processor of the augmented reality eyeglass communication device, product information associated with products comprised in a list of products of a user;
receiving, by the processor, location information associated with location of the user;
searching, based on the product information, by the processor, a database associated with a store for availability, location and pricing information associated with the products;
receiving, by the processor, the availability, location and pricing information associated with the product; and
displaying, by a display of the augmented reality eyeglass communication device, the availability, location and pricing information associated with the product.

64. The method of claim 63, further comprising:
plotting a route for the user on a map of the store based on the availability, location and pricing information associated with the product and the location information associated with the location of the user; and
displaying, by the display, the route for the user.

65. The method of claim 63, further comprising
receiving, by the processor, a command of the user to provide description of a product present in the store;
receiving, by the processor, information associated with the product present in the store, wherein receiving information associated with the product present in the store includes taking a picture of the product, scanning a barcode of the product and reading a RFID tag of the product;
processing, by the processor, the received information associated with the product present in the store;
searching, based on the received information associated with the product, by the processor, the description of the product in a database available in a network;
receiving, by the processor, the description of the product; and
displaying, by the display, the description of the product present in the store.

66. The method of claim 65, further comprising:
tracking, by a camera, a hand gesture command of the user;
processing, by the processor, the hand gesture command of the user; and
projecting, by a projector, the description of the product to a surface in environment of the user according to the hand gesture command, wherein the surface in environment of the user includes a vertical surface in environment of the user, a horizontal surface in environment of the user, an inclined surface in environment of the user, a surface of a physical object in environment of the user, and a part of a body of the user.

67. The method of claim 63, further comprising:
receiving, by the processor, information about the products put by the user into a shopping cart to enable self-checkout; and
removing the products put by the user into the shopping cart from the list of products of the user.

68. The method of claim 67, further comprising:
generating a payment request based on the information about the products put by the user into the shopping cart; and
sending the payment request to a financial organization to perform a payment.

69. The method of claim 67, further comprising:
notifying the user if a product comprised in the list of products of the user is not available in the store; and
searching, by the processor, availability information associated with the not available product in a database of a store located proximate to the location of the used based on location information associated with the location of the user.

70. The method of claim 69, further comprising
searching, the database associated with the store for information about a product having the same characteristics as the not available product;
receiving, by the processor, the information about the product having the same characteristics as the not available product; and
displaying, by the display, the information about the product having the same characteristics as the not available product.

71. The method of claim 63, further comprising:
receiving payment data associated with another user, the payment data including payment account information of another user; and
transferring an amount, based on the payment data associated with the another user, from the payment account of another user to a payment account of the user, information on the payment account of the user being stored in a memory unit of the device or a server.

72. The method of claim 63, further comprising scanning a barcode, the barcode including a one-dimensional barcode, a two-dimensional barcode, a three-dimensional barcode, a quick response code, a snap tag code, and other machine readable codes.

73. The method of claim 72, wherein the barcode encodes one or more of the following: payment data, personal data, credit card data, debit card data, gift card data, prepaid card data, bank checking account data, and digital cash data.

74. The method of claim 72, wherein the barcode includes electronic key data, the barcode being scannable by a web-camera of an access control system and processed by the access control system, wherein access to an item related to the access control system is granted based on the processing.

75. The method of claim 72, wherein the barcode includes a link to a web-resource, a payment request, advertising information, and other information.

76. The method of claim 63, further comprising hands free check-in scanning and hands free check-out scanning.

77. The method of claim 63, further comprising, using a voice or neuron command:
performing a hands free video call;
sending a message;
taking a picture;
recording a video; and
getting directions to a location.

78. The method of claim 63, wherein the augmented reality eyeglass communication device includes one or more of the following: a Software Development Kit and an Application Programming Interface.

79. The method of claim 63, wherein the augmented reality eyeglass communication device is configured to make and receive calls over a radio link while moving around a wide geographic area via a cellular network, access a public phone network, send and receive text, photo, and video messages, access internet, capture videos and photos, and play games.

80. A computer-implemented method for purchasing a product item in a retail environment using an augmented reality eyeglass communication device, the augmented reality eyeglass communication device comprising the augmented reality eyeglass communication device of claim 1, the method comprising:
using the augmented reality eyeglass communication device, sending a request to read one or more product codes;
reading the one or more product codes corresponding to one or more products;
based on the reading, receiving product information;
transmitting data on the reading to a payment processing system;
receiving a request, from a customer, to calculate a total price of the reading;
based on the request, calculating the total price of the reading,
authorizing payment and transmitting authorization to the payment processing system; and
selectively receiving a compensation based on predetermined criteria.

81. The computer-implemented method of claim 80, further comprising receiving a request, from a user, to pay for the one or more products with a restored payment card.

82. The computer-implemented method of claim 80, wherein the total price is encoded in a code, the total price being scannable by a merchant scanning device to transfer payment for the one or more products.

83. The computer-implemented method of claim 80, further comprising:
receiving a request from a user to determine an aisle location of the one or more products; and
determining the aisle location of the one or more products.

84. The computer-implemented method of claim 80, wherein a user creates one or more product lists.

85. The computer-implemented method of claim 80, further comprising connecting to a wireless network of a merchant.

86. The computer-implemented method of claim 80, further comprising receiving digital coupons and offers to make a purchase.

87. The computer-implemented method of claim 80, further comprising receiving promotional offers and advertising.

88. The computer-implemented method of claim 87, wherein the promotional offers and advertising are received from one or more of the following: a merchant, a mobile payment service provider, a third party.

89. The computer-implemented method of claim 80, wherein the compensation includes one or more of the following: cashback, a discount, and a gift card.

90. The computer-implemented method of claim 80, wherein a user receives a digital receipt by email, the digital receipt containing detailed information on cashback and discount.

91. The computer-implemented method of claim 80, further comprising receiving a request, from a user, to check a total amount and price of the reading.

92. The computer-implemented method of claim 91, further comprising selectively removing one or more items of the reading.

93. The computer-implemented method of claim 80, further comprising placing a remote order for home delivery of one or more unavailable products.

94. A method for accessing game and multimedia data and performing communications using an augmented reality eyeglass communication device, the augmented reality eyeglass communication device comprising the augmented reality eyeglass communication device of claim 1, and the method comprising:
receiving a user request to display the game and multimedia data or perform communication;
communicating, over a network, with a game and multimedia server to transfer game and multimedia data or a communication server to transfer communication data; and
displaying the game and multimedia data or the communication data on a display of the augmented reality eyeglass communication device.

95. The computer-implemented method of claim 94, further comprising:
   receiving, by a processor of the augmented reality eyeglass communication device, a user command;
   transferring the user command to the game and multimedia server;
   processing the user command; and
   transferring game and multimedia data related to the processing to the augmented reality eyeglass communication device.

96. The computer-implemented method of claim 94, further comprising:
   receiving, by a processor of the augmented reality eyeglass communication device, incoming communication data;
   notifying the user about the incoming communication data.

97. The computer-implemented method of claim 96, further comprising:
   receiving, by a processor of the augmented reality eyeglass communication device, a user command in response to the incoming communication data;
   displaying the incoming communication data.

98. The computer-implemented method of claim 97, further comprising: generating an audible sound, wherein the sound corresponds to the incoming communication data.

99. The computer-implemented method of claim 97, further comprising: transferring the game and multimedia data or the incoming communication data to a television set, a set-top box, a computer, a laptop, a smartphone, or a wearable personal digital device.

* * * * *